United States Patent [19]

Tanaka

[11] Patent Number: 5,729,395
[45] Date of Patent: Mar. 17, 1998

[54] VIDEO TAPE RECORDER WITH LIQUID CRYSTAL DISPLAY PROJECTOR HAVING A HEAD DRUM WITH FINS

[75] Inventor: Sumio Tanaka, Tokyo, Japan

[73] Assignee: Goldstar Co., Ltd., Seoul, Rep. of Korea

[21] Appl. No.: 341,889

[22] Filed: Nov. 15, 1994

[30] Foreign Application Priority Data

Nov. 19, 1993 [JP] Japan .................. 5-62145 U

[51] Int. Cl.⁶ .................................................. G11B 15/60
[52] U.S. Cl. ..................... 360/69; 360/130.24; 360/128
[58] Field of Search ............................ 360/69, 137, 79, 360/97.02, 97.03, 97.04, 128, 130.22, 130.23, 130.24

[56] References Cited

U.S. PATENT DOCUMENTS

| | | | |
|---|---|---|---|
| 3,624,624 | 11/1971 | Johnson | 340/174.1 E |
| 4,899,231 | 2/1990 | Maeda et al. | 360/55 X |
| 5,109,313 | 4/1992 | D'Alayer de Costemore d'Arc | 360/128 |
| 5,206,771 | 4/1993 | Katou et al. | 360/71 |
| 5,422,771 | 6/1995 | Willomitzer et al. | 360/108 |

FOREIGN PATENT DOCUMENTS 02095440  4/1992  Japan .

Primary Examiner—Aristotelis M. Psitos
Assistant Examiner—Larry T. Cullen

[57] ABSTRACT

A Video Tape Recorder (VTR) with a liquid crystal display (LCD) projector free from a radiating blower is disclosed. The VTR with LCD projector includes a plurality of fins positioned on a top surface of a rotary head drum for generating air currents during rotation of a rotary head drum of a VTR part. A polarizing plate of the LCD projector part is cooled by the air currents generated by the fins. The VTR with LCD projector achieves compactness and reduction of cost, in keeping with the recent market trend.

13 Claims, 5 Drawing Sheets

VIDEO TAPE RECORDER WITH LIQUID CRYSTAL DISPLAY PROJECTOR HAVING A HEAD DRUM WITH FINS

BACKGROUND OF THE INVENTION

1. Field of the Invention

The present invention relates in general to a video tape recorder with liquid crystal display projector and, more particularly, to a structural improvement in such a video tape recorder for reducing production cost and for achieving the recent trend of compactness.

2. Description of the Prior Art

As well known to those skilled in the art, a liquid display projector (hereinbelow, referred to simply as "the LCD projector") is an application of a liquid crystal display (LCD). In the typical LCD projector, light of a light source is applied on the back of an LCD panel. The pattern of light transmitted through the LCD panel is, thereafter, projected on a screen by a projection lens, thus to produce a picture on the screen. The applicant has proposed a useful video tape recorder (VTR) with LCD projector in Japanese Patent Application No. Heisei. 5-256906, as illustrated in FIG. 3. In the above VTR with LCD projector of this applicant, the VTR is integrated with a small-sized LCD projector, thus to improve its usability.

With reference to FIG. 2, there is shown an outer appearance of a typical VTR with LCD projector. In this drawing, the reference numeral 8 denotes a housing 8 which encases a small-sized LCD projector and a VTR therein. The front surface of the housing 8 is provided with a tape cassette insert opening 10, operational mode control buttons 15 and an LCD projector back screen 9. When the back screen 9 is opened, the light of the LCD panel is not projected on the back screen 9, but projected on a wide screen 7 placed in the front of the housing 8, thus to produce a large-sized picture on the wide screen 7.

FIG. 3 shows in detail the LCD projector part and the VTR part which are encased in the housing 8. As shown in this drawing, the VTR part is placed in the lower section of the interior of the housing 8, while the LCD projector part is placed in the upper section of the interior of the housing 8. In FIG. 3, the VTR part and the LCD projector part are oriented in opposite directions in order to promote comprehension of them.

In the LCD projector part, a projection lens 1, an LCD panel 2 having a first polarizing plate and a color filter therein, a second polarizing plate 3, a blower 6, an infrared ray blocking filter 4 and a halogen lamp 5 are axially arranged in order. The light of the halogen lamp 5 is transmitted through the infrared ray blocking filter 4, so that a specified deflected beam is selected by the polarizing plate 3. The specified deflected beam is, thereafter, projected on the LCD panel 2. In the LCD panel 2, the voltage applied on each cell is controlled, so that the LCD panel 2 changes the deflected beam selected by the polarizing plate 3 so as to make the deflected beam be transmitted or not transmitted through the first polarizing plate of the LCD panel 2. The voltage applied on the LCD panel 2 is controlled by a video signal, so that the deflected beam is modulated and projected on either the wide screen 7 or the back screen 9 by the projection lens 1.

As described above, the VTR part is placed in the lower section of the interior of the housing 8. The VTR part shown in FIG. 3 is loaded with a tape cassette. In FIG. 3, the reference numeral 11 denotes the tape cassette, the numeral 12 denotes a magnetic tape of the tape cassette 11, and the numeral 13 denotes a rotary head drum having a magnetic head (not shown) for reading out the video signals recorded on the magnetic tape 12. During PLAY mode of the VTR part, the magnetic tape 12 is supplied from a supply reel of the cassette 11 and is taken up by a take-up reel of the cassette 11 at a predetermined velocity. The magnetic head provided on the rotary head drum 13, which head drum 13 is rotated at 1800 rpm, continuously reads out the video signals of the magnetic tape 12.

As the LCD projector part and the VTR part are commonly encased in the housing 8, it is possible to simplify the wiring for the signal lines and for the power lines. The simplification of wiring prevents possible signal deterioration.

At least 60% of the light received by the polarizing plate 3 after being transmitted through the infrared ray blocking filter 4 is blocked by the polarizing plate 3. The light checked by the polarizing plate 3 is converted into heat in the polarizing plate 3 and the heat may cause thermal deformation of the polarizing plate 3. In order to prevent the thermal deformation of the polarizing plate 3, the blower 6 is provided in the LCD projector. The blower 6 is driven by a motor (not shown) and generates air current, which air current will cool the polarizing plate 3, thus to prevent the thermal deformation of the polarizing plate 3 due to the heat of the plate 3. In order to promote cooling effect of the polarizing plate 3, the polarizing plate 3 is preferably spaced from the LCD panel 2.

As described above, the typical VTR equipped with LCD projector includes the blower 6 for cooling the polarizing plate 3 and for preventing thermal deformation of the polarizing plate 3. The radiating blower 6 should be used with a drive motor. The radiating blower 6 and its drive motor make the typical VTR equipped with LCD projector to be increased in its cost and large-sized. The large-sized VTR with LCD projector runs counter to the recent trend of compactness of the VTR.

SUMMARY OF THE INVENTION

It is, therefore, an object of the invention to provide a VTR with LCD projector in which the above problems can be overcome and which is free from the blower for cooling a polarizing plate of an LCD projector part, thus to achieve the recent trend of compactness and reduction of cost of the VTR with LCD projector.

In order to accomplish the above object, a VTR with an LCD projector in accordance with an embodiment of the present invention comprises: a plurality of fins for generating air current at the same time of rotation of a rotary head drum of a VTR part, the fins are provided on the top surface of the rotary head drum, whereby a heating member or a polarizing plate of an LCD projector part is cooled by the air current generated by the fins.

In an embodiment, the LCD projector part and the VTR part are arranged in a housing, so that the heating member of the LCD projector part is placed above the rotary head drum having the fins.

In another embodiment, the air current generated by the fins is introduced to the heating member through air current introduction means such as a duct extending between the rotary head drum and the heating member.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

Figure 1:
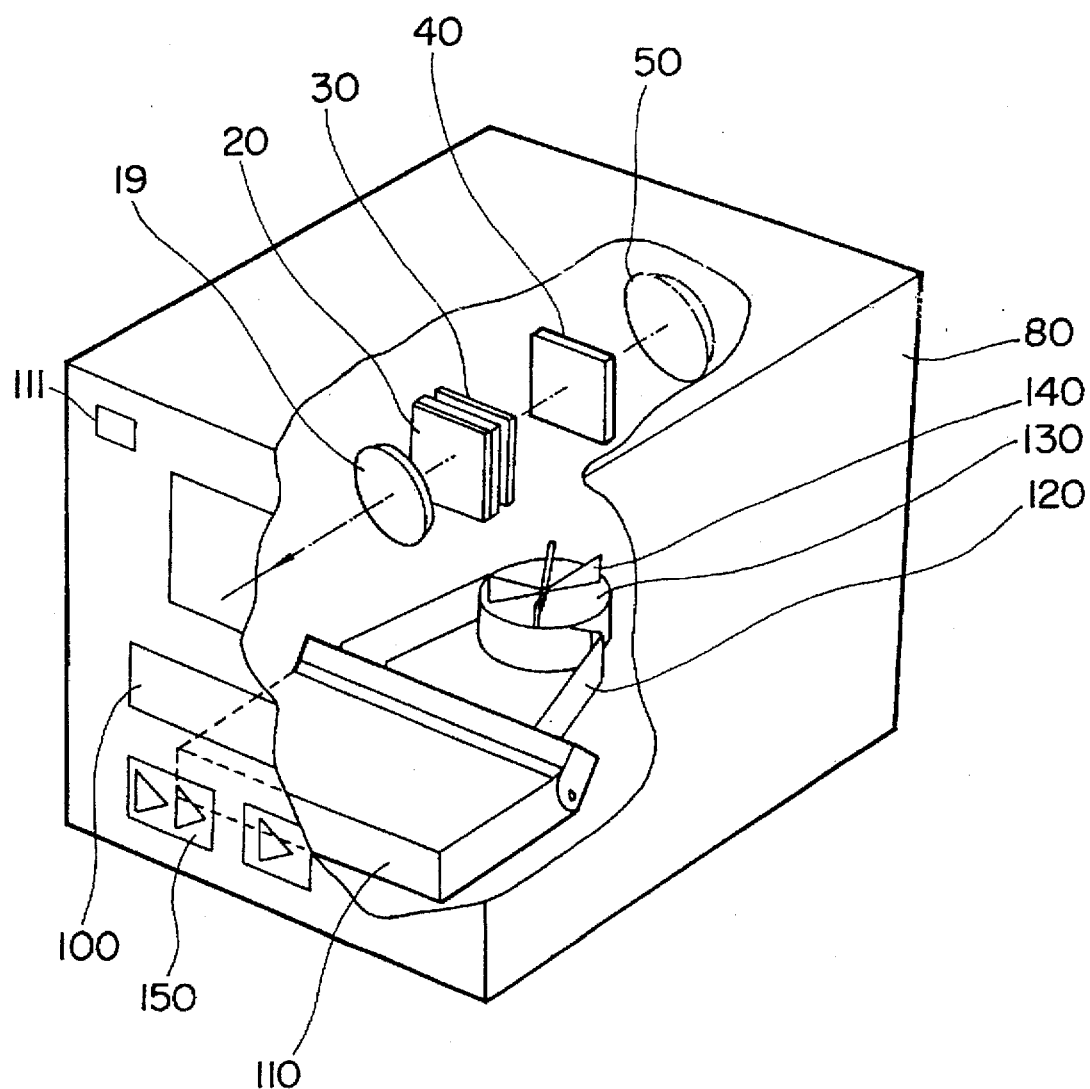
FIG. 1 is a partially broken perspective view of a VTR with LCD projector in accordance with an embodiment of the present invention.
Figure 2:
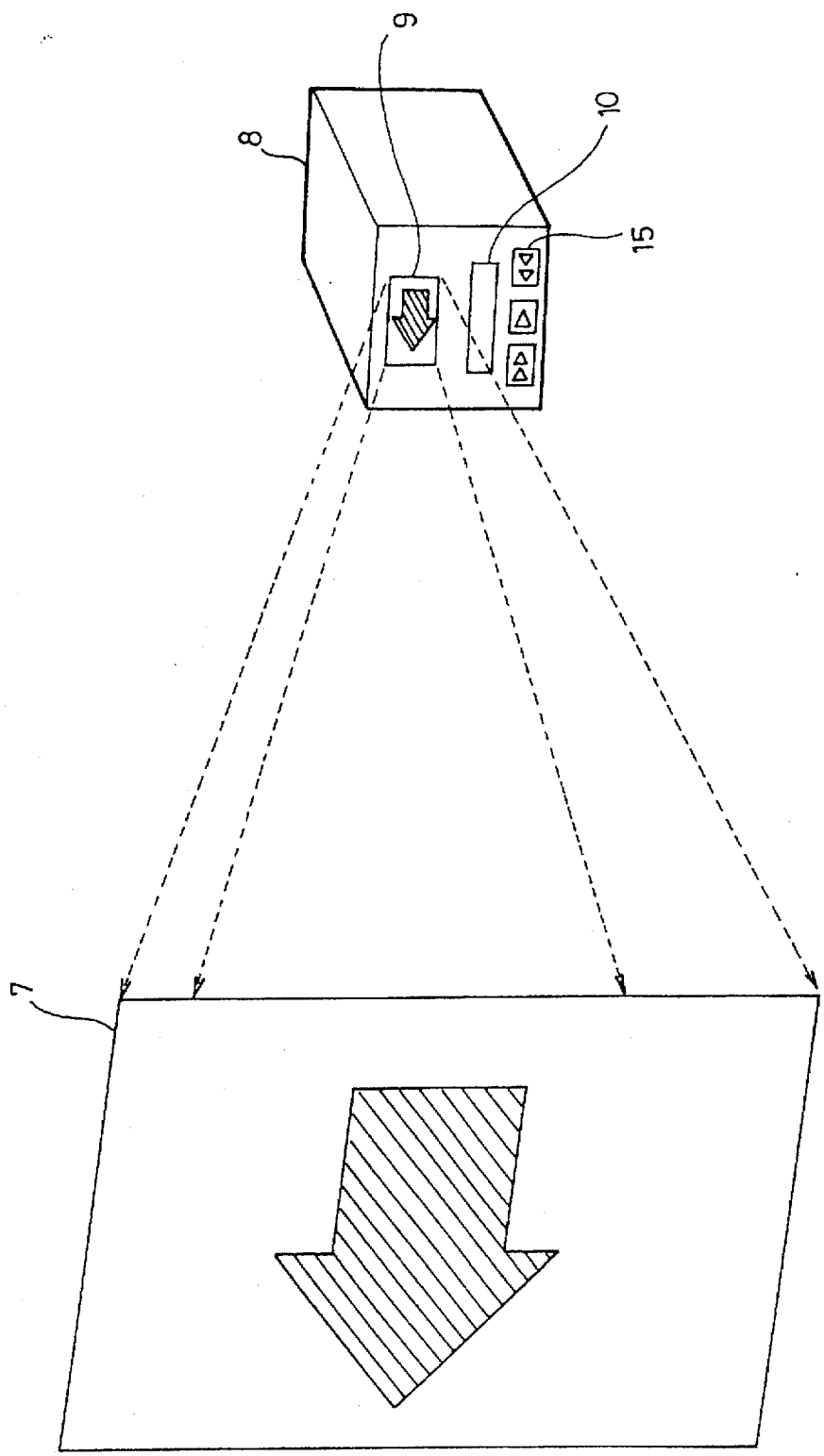
FIG. 2 is a perspective view of a conventional VTR with LCD projector and its image project.

FIG. 1 is a partially-broken perspective view of a VTR with LCD projector in accordance with an embodiment of the present invention, and FIG. 2 shows an image projection of the VTR in FIG. 1.

As shown in FIGS. 1 and 2 the reference numeral 80 denotes a housing 80 which encases a small-sized LCD projector and a VTR therein. The front surface of the housing 80 is provided with a tape cassette insert opening 100, operational mode control buttons 150 and an LCD projector back screen 90. The VTR part is placed in the lower section of the interior of the housing 80, while the LCD projector part is placed in the upper section of the interior of the housing 80.

In the LCD projector part, a projection lens 19, an LCD panel 20 having a first polarizing plate and a color filter therein, a second polarizing plate 30, an infrared ray checking filter 40 and a halogen lamp 50 are axially arranged in order.

The VTR part, which is placed in the lower section of the interior of the housing 80, is loaded with a tape cassette 110. In order to load the tape cassette 110, the cassette 110 is inserted into the housing 80 through the tape cassette insert opening 100. A magnetic tape 120 is supplied from a supply reel of the cassette 110 and wrapped about a rotary head drum 130. During the PLAY mode of the VTR part which is activated by operational mode control buttons 150, the magnetic tape 120 is supplied from the supply reel of the cassette 110 and took up by a take-up reel of the cassette 110 by the rotary head drum 130. At this time, a magnetic head (not shown) of the rotary head drum 130 continuously reads out the video signals of the magnetic tape 120. During the PLAY mode, the magnetic tape 120 is took up by the take-up reel at a predetermined velocity, while the head drum 130 is rotated at 1800 rpm.

Figure 5:
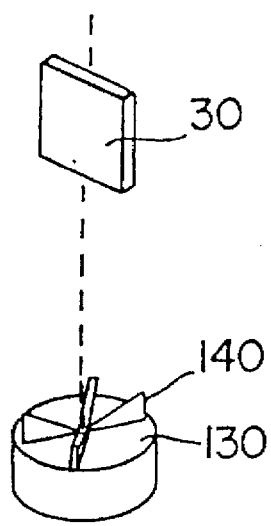
FIG. 5 shows a relationship between the fins and a polarizing plate of the VTR with LCD projector of FIG. 1.

The rotary head drum 130 of the invention is provided on its top surface with a plurality of fins 140 (e.g. four fins). The fins 140 extend upwardly from the top surface of the drum 130 and are spaced out at regular intervals. In the housing 80, the LCD projector part is arranged so that the polarizing plate 30 of the projector part is located in the vertical center axis of the head drum 130, as shown in FIG. 5. When the head drum 130 is rotated at a high speed, fins 140 provided on the top surface of the head drum 130 agitate air, thus to generate air current about the head drum 130. This air current generated by the fins 140 rapidly draws the air about the polarizing plate 30 to about the fins 140, so that any heat generated by the polarizing plate 30 is rapidly removed to cool the heated polarizing plate 3.

In the above VTR with LCD projector of this invention, the polarizing plate 30 of the LCD projector part is effectively cooled by the air current generated at the same time of rotation of the rotary head drum 130 during the PLAY mode of the VTR part. As the VTR part is provided with a TV receiving tuner, it is possible to record a TV program on the magnetic tape 120 using the VTR part at the same time of viewing the TV program using the LCD projector part. During a REC mode for recording the TV program, the rotary head drum 130 is rotated, in the same manner as described for the PLAY mode, to generate the air current about the polarizing plate 30 and to cool the plate 30.

However, when the VTR part is in a standby state or when the LCD projector part is operated by a video signal outputted from another video system, the rotary head drum 130 of the VTR part may not be rotated. When a power switch 111 of the VTR with LCD projector is turned on in this case, the LCD projector part starts its operation, while the VTR part is in the standby state. In this case, the polarizing plate 30 generates heat since the LCD projector part is in operation. However, the rotary head drum 130 is usually not rotated when the VTR part is in the standby state, so that there is no air current generated about the fins 140 of the drum 130. This may cause the polarizing plate 30 to be thermally deformed due to the heat of the plate 30. In order to solve the above problem, the VTR part is designed so that the rotary head drum 130 is rotated irrespective of the operation of the VTR part whenever the LCD projector part is in operation. For example, the rotary head dram 130 may be automatically rotated after lapse of several seconds after turning on the power switch even when no tape cassette is loaded in the VTR part. In this regard, even when the LCD projector part is applied with a video signal of another video system and produces a picture on either the wide screen 70 or the back screen 90, as shown in FIG. 3, the rotary head drum 130 of the VTR part is rotated so as to cool the polarizing plate 30 of the LCD projector part.

In the present invention, such a rotation of the rotary head drum 130 is simply achieved using a part of a typical circuit of the VTR part. The VTR part is typically provided with a drum dry mode for drying the rotary head drum when the drum surface is moisturized. That is, when the drum surface is moisturized, a dew sensor of the VTR part senses the moisture and stops insert of the tape cassette and drys the moisturized drum surface. In the present invention, the VTR part is designed so that the typical drum dry mode is started when the power switch is turned on in the above case. Therefore, the VTR with LCD projector of the invention has no additional circuit but easily rotates the rotary head drum 130 so as to generate the air current about the fins 140 and to cool the polarizing plate 30 when the LCD projector part starts its operation while the VTR part is in the standby state.

Figure 3:
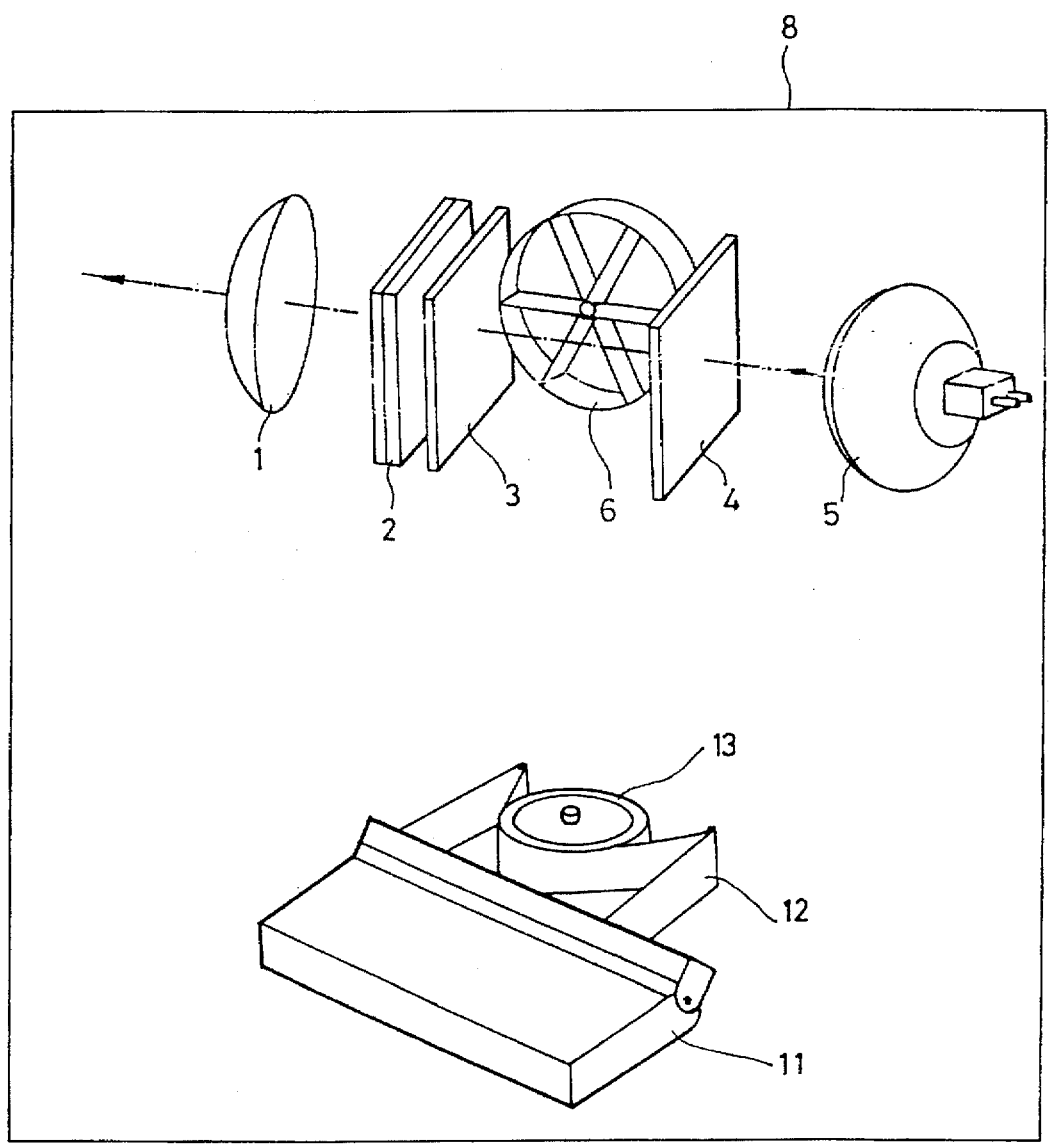
FIG. 3 is a perspective view showing an inside construction of the conventional VTR with LCD projector of FIG. 2.
Figure 4:
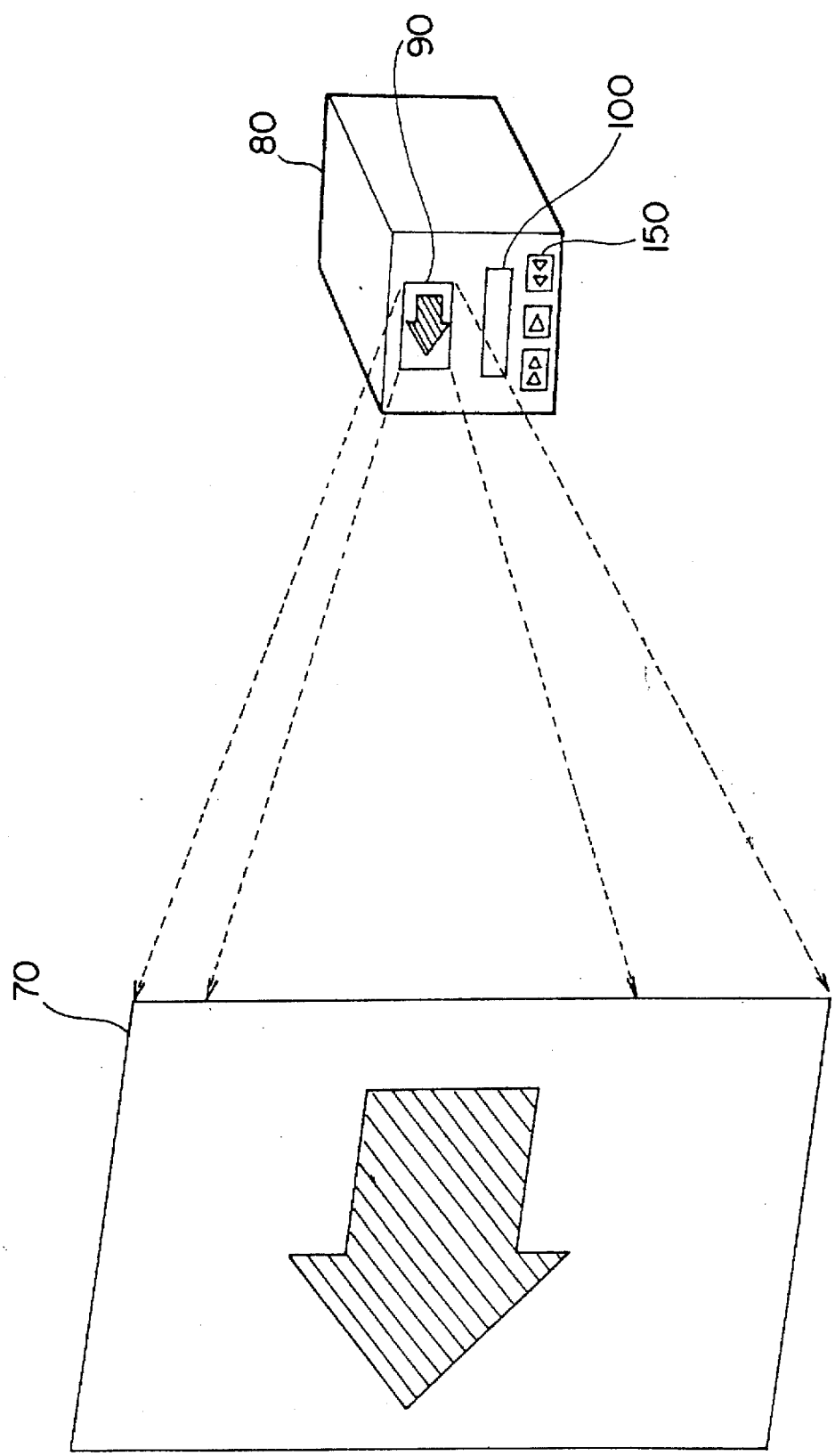
FIG. 4 shows a perspective view of the VTR with LCD projector of FIG. 1 and its image projection in accordance with the embodiments of the present invention.
Figure 6:
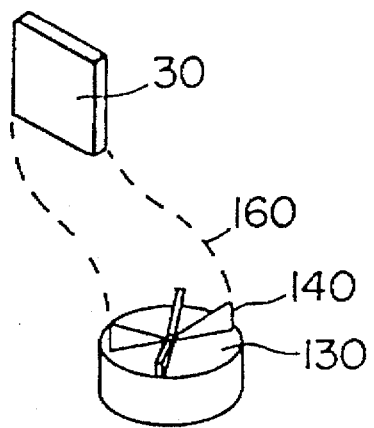
FIG. 6 shows a duct employed in the VCR with LCD projector according to the embodiments of the present invention.

When the VTR part and the LCD projector part are arranged in the same plane as disclosed in the applicant's Japanese Patent Application No. Heisei. 5-256906 (as illustrated in FIG. 3), the polarizing plate 30 of the LCD projector part may not be placed above the rotary head drum 130 of the VTR part. However in this case, a duct 160 (shown in FIG. 6) as air current introduction means may be provided between the polarizing plate 30 and the rotary head drum 130 having the fins 140 to provide a passage between the rotary head drum 130 and the polarizing plate 30 and to draw the heated air about the polarizing plate 30 to current from the rotary head drum 130 using the air current generated by the rotation of the rotary head drum 130.

If briefly describing the invention, the rotary head drum having the fins is rotated at a high speed when the LCD projector part is in operation, so that the air about the head drum is agitated by the fins to generate an air current. The generated air current directly affects the air about the polarizing plate or is introduced to the polarizing plate through a duct extending between the head drum and the polarizing plate. Therefore, the heat generated by the polarizing plate is exhausted by the air current, so that the polarizing plate is not thermally deformed.

As described above, a VTR with LCD projector of the invention is free from the typical radiating blower, but effectively cools a heated polarizing plate of an LCD projector part, to achieve the recent trend of compactness and reduction of cost of the VTR with LCD projector.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A video tape recorder with liquid crystal display projector having a power switch, comprising:

an LCD projector part including a lamp for generating light, an infrared ray blocking filter, a polarizing plate, an LCD plate, and a projection lens, which are arranged a housing of said video tape recorder with liquid crystal display projector; and a video cassette tape recorder part provided horizontally in a lower portion of said housing and including a rotary head drum onto which a tape extended from a tape cassette is wound, said rotary head drum provided with a plurality of fins on an upper surface thereof so as to directly cool said polarizing plate by agitating air above the rotary head drum, wherein said fins are adapted to agitate air in cooperation with a rotation force of the rotary head drum, and wherein a dry drum mode is automatically started after the power switch is turned on to rotate said fins for cooling said polarizing plate.

2. The video tape recorder with liquid crystal display projector of claim 1, wherein said fins are spaced from each other at an interval.

3. The video tape recorder with liquid crystal display projector of claim 1, wherein said polarizing plate is located in a vertical central axis of said rotary head drum so that said fins of said rotary head drum generate an air current for cooling said polarizing plate.

4. The video tape recorder with liquid crystal display projector of claim 1, wherein said rotary head drum is positioned immediately below the polarizing plate.

5. The video tape recorder with liquid crystal display projector of claim 1, wherein said upper surface is horizontal.

6. The video tape recorder with liquid crystal display projector of claim 1, wherein said head drum is operated to rotate and provide cooling air to said polarizing plate during a standby state of said video cassette tape recorder part.

7. The video tape recorder with liquid crystal display projector of claim 1, wherein the dry drum mode also operates to dry the head drum.

8. The video tape recorder with liquid crystal display projector of claim 7, wherein the dry drum mode is automatically started immediately after the power switch is turned on.

9. The video tape recorder with liquid crystal display projector of claim 1, wherein said head drum is rotated automatically after several seconds after turning on the power switch.

10. The video tape recorder with liquid crystal display projector of claim 9, wherein once said head drum rotates, only said LCD projector part is operated by a video signal outputted from an external video system.

11. The video tape recorder with liquid crystal display projector of claim 1, wherein there are exactly four of said fins.

12. The video tape recorder with liquid crystal display projector of claim 1, further comprising:

a duct for connecting said polarizing plate and said head drum.

13. The video tape recorder with liquid crystal display projector of claim 1, wherein said lamp, said infrared ray blocking filter, said polarizing plate, said LCD plate and said projection lens are arranged in order from a rear end of said housing.

* * * * *